United States Patent [19]
Tanaka et al.

[11] Patent Number: 5,628,113
[45] Date of Patent: May 13, 1997

[54] METAL GASKET ASSEMBLY

[75] Inventors: Akira Tanaka, Ohmiya; Masamichi Hoshi, Urawa, both of Japan

[73] Assignee: Nippon Leakless Industry Co., Ltd., Tokyo, Japan

[21] Appl. No.: 506,120

[22] Filed: Jul. 24, 1995

Related U.S. Application Data

[62] Division of Ser. No. 270,316, Jul. 5, 1994, abandoned.

[30] Foreign Application Priority Data

Jul. 7, 1993 [JP] Japan ................................ 5-167929

[51] Int. Cl.⁶ .................................................... H01R 43/00
[52] U.S. Cl. ...................... 29/888.3; 277/180; 277/235 B
[58] Field of Search ........................... 277/180, 235 B, 277/236, 198, 189; 29/888.3; 228/161

[56] References Cited

U.S. PATENT DOCUMENTS 5,332,237  7/1994  Hagiwara ............... 277/235 B

FOREIGN PATENT DOCUMENTS

| 0465268 | 1/1992 | European Pat. Off. . |
| 0499551 | 8/1992 | European Pat. Off. . |
| 4308726 | 12/1993 | Germany . |
| 63-149479 | 6/1988 | Japan . |
| 1-77740 | 3/1989 | Japan . |
| 5-106738 | 4/1993 | Japan . |
| 5-126257 | 5/1993 | Japan . |

Primary Examiner—Daniel G. DePumpo
Attorney, Agent, or Firm—Young & Thompson

[57] ABSTRACT

A metal gasket assembly comprises a substrate metal sheet having at least one opening, and a peripheral member fitted into the opening along the periphery thereof. The peripheral member is made of a metal plate having a thickness larger than that of the substrate metal sheet.

5 Claims, 6 Drawing Sheets

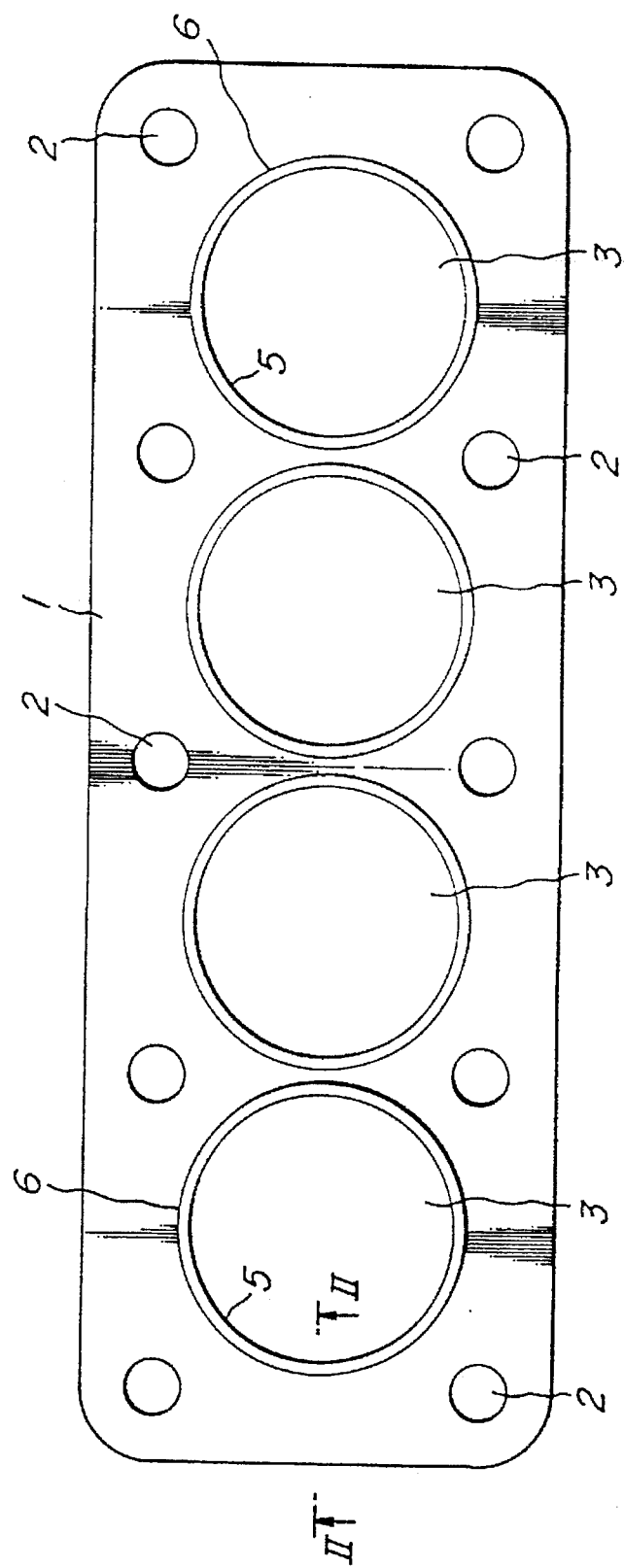
FIG_1
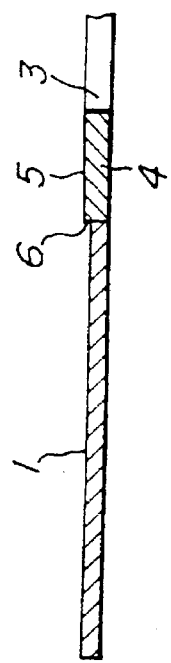
FIG_2

FIG_12
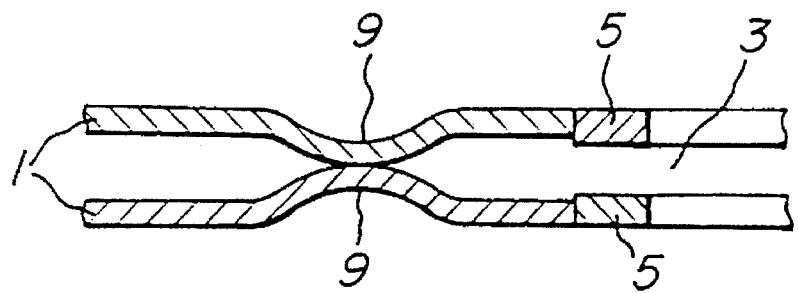
FIG_13
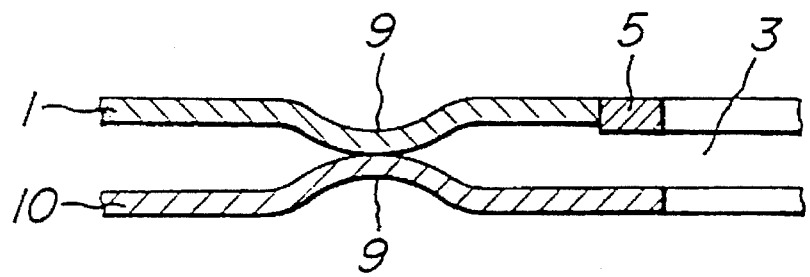
FIG_14
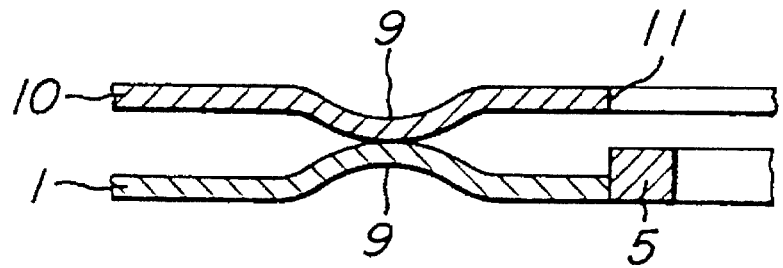

METAL GASKET ASSEMBLY

This application is a division of application Ser. No. 08/270,316, filed Jul. 5,1994, abandoned.

BACKGROUND OF THE INVENTION

1. Field of the Invention

The present invention relates to a metal gasket assembly comprised primarily of metal components such as stainless steel plates.

2. Description of the Related Art

A conventional metal gasket assembly generally comprises one or more metal plates having openings and beads formed around the openings. Such a metal gasket assembly is typically used in an internal combustion engine as a seal between a cylinder block and a cylinder head.

To improve the sealing effect of a metal gasket assembly, there has been proposed to attach a shim to a substrate metal sheet at a region surrounding a cylinder opening so that the fastening pressure applied to the metal gasket assembly is locally increased in that region.

However, the conventional metal gasket assembly interposed between the cylinder block and the cylinder head requires a strong fastening by bolts for effective sealing, and thus it may cause a deformation in the cylinder head. Particularly, in a portion around a combustion chamber, the deformation in the cylinder head tends to increase the size of a gap formed between the cylinder block and the cylinder head. This gap allows an escape of combustion gases from the chamber, which leads to a contamination of the metal gasket assembly and hence, to a gradual deterioration of the seal between the cylinder block and the cylinder head.

Moreover, since the size of the gap around the combustion chamber changes corresponding to the change of combustion pressure in the internal combustion engine, beads provided on the metal gasket assembly is subjected to an alternate load of compression and restoration, thereby giving rise to fatigue of the beads on the metal gasket assembly. The fatigued beads with reduced elasticity weaken the fastening function of bolts, with the result that the sealing effect of the metal gasket assembly is decreased.

Furthermore, in the case of a metal gasket assembly employing a shim ring, the thickness of the shim ring is significantly influential on the sealing performance of the metal gasket assembly. However, it is difficult to adjust the shim thickness to 0.05 mm or less, because of difficulties in producing, with a sufficient accuracy, a plate of such thickness for the use as a shim.

SUMMARY OF THE INVENTION

It is therefore a primary object of the present invention to provide an improved metal gasket assembly which is free from the disadvantages inherent in the conventional metal gasket assembly.

To attain the above-mentioned object, a metal gasket assembly according to the present invention comprises a substrate metal sheet with at least one opening, and a peripheral member fitted into the opening along the periphery thereof, which peripheral member being made of a metal plate having a thickness larger than that of the substrate metal sheet.

With the above-mentioned arrangement in accordance with the present invention, since the thickness of the peripheral member is larger than that of the substrate metal sheet, the fastening by bolts is particularly effective in the peripheral member, thereby improving the sealing performance at that portion of the metal gasket assembly.

Moreover, when a metal gasket assembly of the present invention is used in an internal combustion engine for a seal between a cylinder block and a cylinder head, an opening of the metal gasket assembly for a combustion chamber is formed by the circumferentially inner periphery of a peripheral member. Accordingly, a gap between the cylinder block and the cylinder head caused by the fastening of bolts can be made smaller at the region around the combustion chamber due to the peripheral member which has a larger thickness than the substrate metal sheet of the metal gasket assembly. As a result, it can obviate such an escape of combustion gases from the combustion chamber that causes a contamination of the metal gasket assembly, thereby preventing decrease of sealing effect.

The smaller gap reduces the alternate load, which is caused by the combustion pressure within the combustion chamber and works on beads of the metal gasket assembly, thereby suppressing fatigue of the beads. This also contributes to prevention of decrease in the sealing effect.

Since an increase in thickness at the periphery of openings is produced by using a peripheral member made of a separate metal plate having a larger thickness than a substrate metal sheet, instead of superposing a shim ring on the peripheral portion of the substrate metal sheet, an increase of 0.05 mm or less can be easily and accurately achieved by the present invention.

The present invention also provides a method for producing a metal gasket assembly, which comprises the steps of:

perforating a substrate metal sheet so that the substrate metal sheet has at least one aperture larger than a desired opening;

fitting a metal plate member having a thickness larger than that of the substrate metal sheet into the aperture along the periphery thereof and welding them together; and perforating the welded metal plate member to form the desired opening thereon.

Since it is after the completion of the welding that the desired opening is provided on the metal plate member to form it into a peripheral member, the width of the peripheral member is never affected by the welding in the present invention. Accordingly, the metal gasket assembly of the present invention can be produced with an excellent dimension accuracy even when the peripheral member is 1–2 mm in width, because it is free from deformations due to welding.

BRIEF DESCRIPTION OF THE DRAWINGS

The present invention will be further explained in detail below with reference to the accompanying drawings, in which:

FIG. 1 is a plan view showing a metal gasket assembly according to the first embodiment of the present invention;

FIG. 2 is an enlarged sectional view taken along the line II—II in FIG. 1, showing the metal gasket assembly according to the first embodiment of the present invention;

FIG. 12 is an enlarged sectional view showing a part of a metal gasket assembly according to the sixth embodiment of the present invention, which corresponds to the portion shown in FIG. 2;

FIG. 13 is an enlarged sectional view showing a part of a metal gasket assembly according to the seventh embodiment of the present invention, which corresponds to the portion shown in FIG. 2; and FIG. 14 is an enlarged sectional view showing a part of a metal gasket assembly according to the eighth embodiment of the present invention, which corresponds to the portion shown in FIG. 2.

It should be noted that same reference numerals are used to denote same or equivalent elements or components throughout the drawings.

DESCRIPTION OF THE PREFERRED EMBODIMENT

Figure 3:
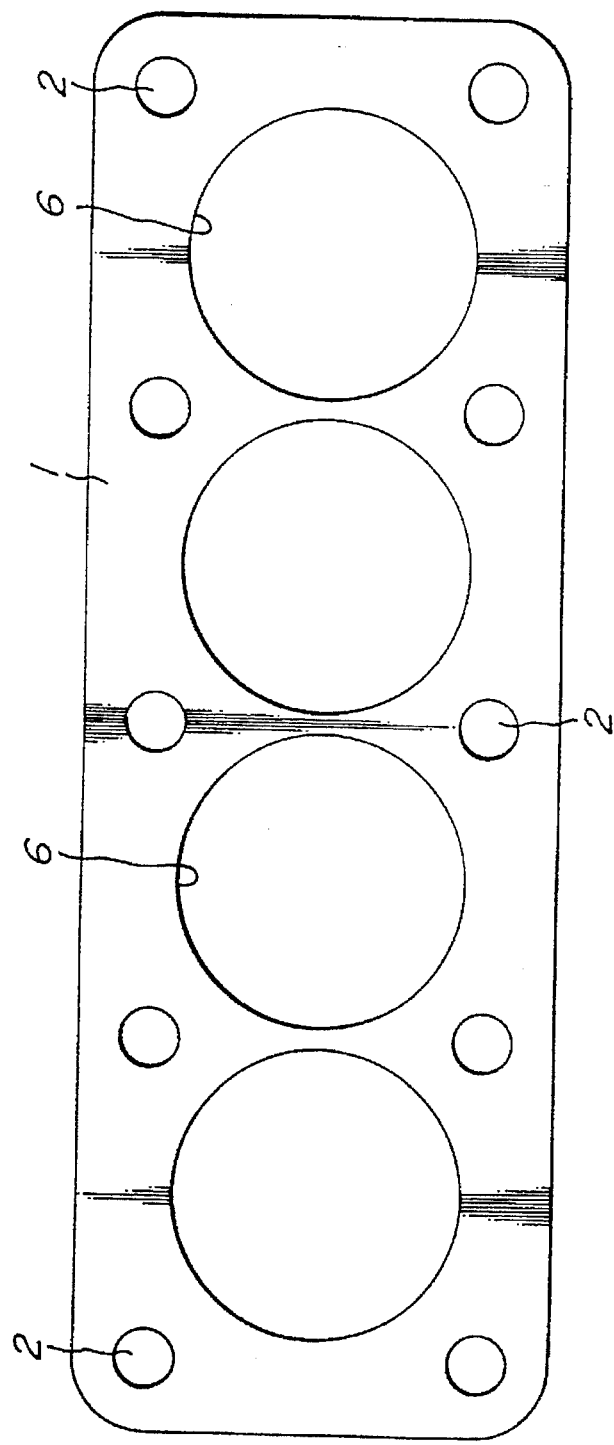
FIG. 3 is a plan view illustrating a method for producing a metal gasket assembly according to the present invention.

Referring now to FIGS. 1 and 2, there is shown a metal gasket assembly A according to the first embodiment of the present invention. The assembly includes a substrate metal sheet 1 which is made of a stainless steel sheet having a thickness of 0.25 mm. The substrate metal sheet 1 is provided with bolt holes 2 and apertures 6 each corresponding to a cylinder opening 3. A peripheral member 5 made of a metal plate 4 having a larger thickness than that of the substrate metal sheet 1, namely a thickness of 0.30 mm, is fitted into the respective apertures 6 so that one surface thereof is coplanar with either surface of the substrate metal sheet 1. The circumferentially inner periphery of each peripheral member 5 defines a cylinder opening 3.

Figure 4:
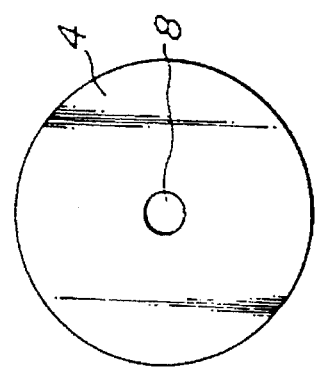
FIG. 4 is a plan view showing a metal plate member to be fitted into an aperture of a substrate metal sheet shown in FIG. 3.
Figure 5:
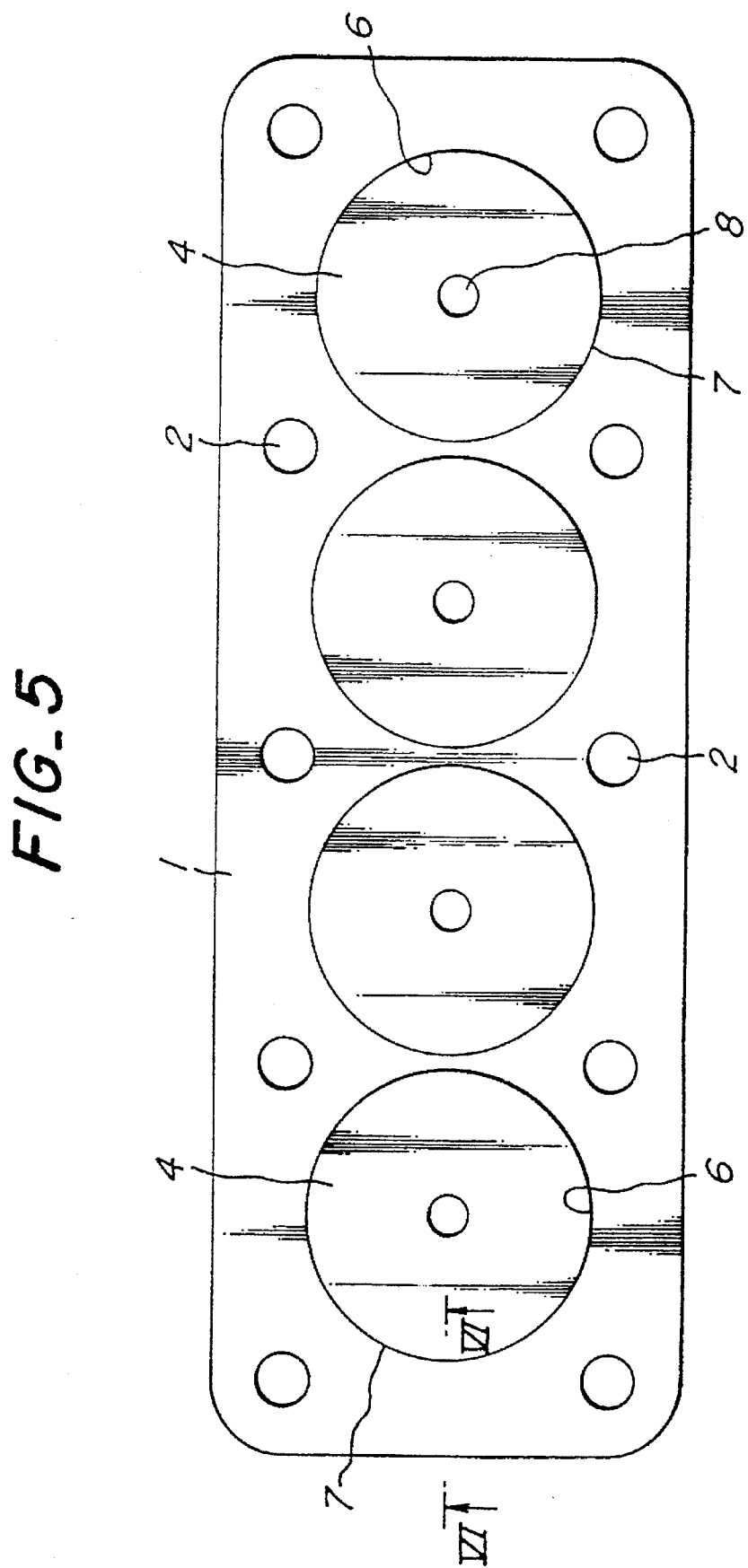
FIG. 5 is a plan view showing the substrate metal sheet of FIG. 3 with the metal plate members of FIG. 4 fitted in the apertures of the substrate metal member.
Figure 6:
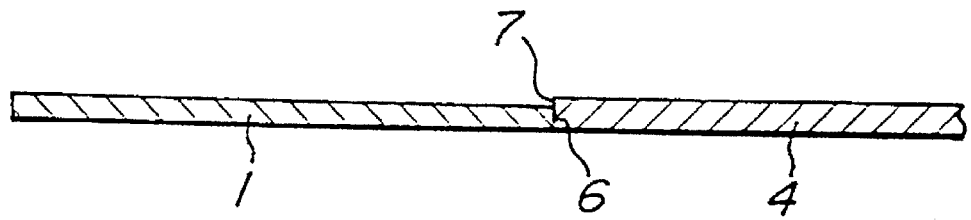
FIG. 6 is an enlarged sectional view taken along the line VI—VI in FIG. 5.

Referring to FIGS. 3–6, there is illustrated a method for producing the metal gasket assembly A shown in FIGS. 1 and 2. As shown in FIG. 3, the substrate metal sheet 1 is firstly provided with the aperture 6 which is larger than the cylinder opening 3 where a particularly effective seal is required. As shown in FIG. 4, the metal plate 4 having a thickness larger than the substrate metal sheet 1 is formed into such a shape that can be rightly fitted into the aperture 6 along the periphery thereof. After fitting the metal plate 4 into the aperture 6 so that one of its surfaces is coplanar with either surface of the substrate metal sheet 1 as shown in FIG. 5, the fitted portion 7 is subjected to welding. Then, the cylinder opening 3 is formed on the welded metal plate 4, thereby forming the metal plate 4 into the peripheral member 5. A bore 8 preliminarily formed in the center of the disk-shaped metal plate 4 is provided for positioning. In this connection, pulse-driven YAG laser-welding may preferably be employed for the welding of the metal plate 4.

The above-described metal gasket assembly A may be used alone or in combination with other components. When the metal gasket assembly A alone is used between a cylinder block and a cylinder head in an internal combustion engine, since the peripheral member 5 is thicker than the substrate metal sheet 1, fastening pressure of bolts is applied thereon, namely on the portion surrounding the cylinder opening 3, most. As a result, an escape of combustion gases can be effectively prevented, thereby avoiding contamination of the metal gasket assembly that leads to undesirable deterioration in the sealing effect.

In addition, an increase in thickness at the periphery of the cylinder opening 3 is realized as a difference between the thickness of the substrate metal sheet and that of the peripheral member 5, rather than as a thickness of a shim ring to be superposed on the substrate metal sheet 1 in a region adjacent to the opening 3. Therefore, an increase of 0.05 mm or less, which has been difficult to be realized in the conventional metal gasket assembly, can be easily and accurately achieved by the present invention.

Figure 7:
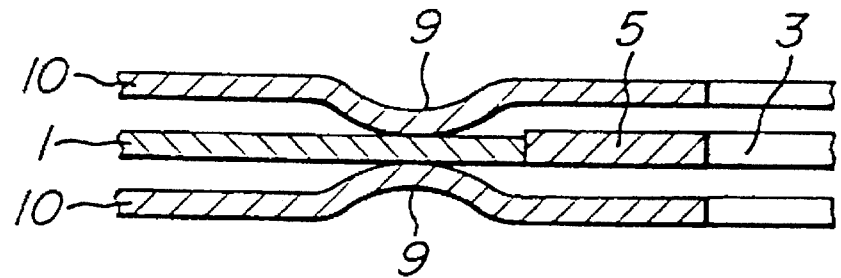
FIG. 7 is an enlarged sectional view showing a part of a metal gasket assembly according to the second embodiment of the present invention, which corresponds to the portion shown in FIG. 2.

Referring to FIG. 7, there is shown a metal gasket assembly according to the second embodiment of the present invention, wherein the metal gasket assembly A according to the first embodiment is sandwiched between two by-plates 10 which respectively have openings at locations corresponding to the openings of the metal gasket assembly A and a bead 9 formed on a region adjacent to an opening for cylinder. In this embodiment, for example, the substrate metal sheet 1 and by-plates 10 may have a thickness of 0.25 mm and the peripheral member 5 may have a thickness of 0.3 mm.

With this arrangement, sealing performance of the metal gasket assembly is generally enhanced due to the beads 9 of the by-plates 10 which increase the elasticity of the entire metal gasket assembly.

Figure 8:
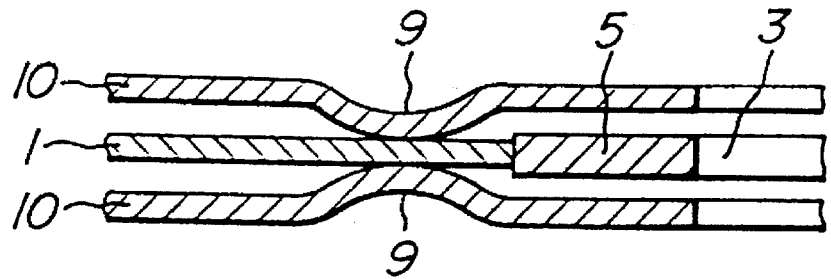
FIG. 8 is an enlarged sectional view showing a part of a modified metal gasket assembly according to the second embodiment of the present invention, which corresponds to the portion shown in FIG. 2.

Referring to FIG. 8, there is shown a variant of the metal gasket assembly according to the second embodiment, which differs therefrom only in that the peripheral member 5 has a thickness of 0.35 mm and welded to the substrate metal sheet 1 so that the central planes, in thickness-wise direction, of the peripheral member 5 and the substrate metal sheet 1 is coplanar with each other. This metal gasket assembly functions almost the same as that according to the second embodiment of the present invention.

Figure 9:
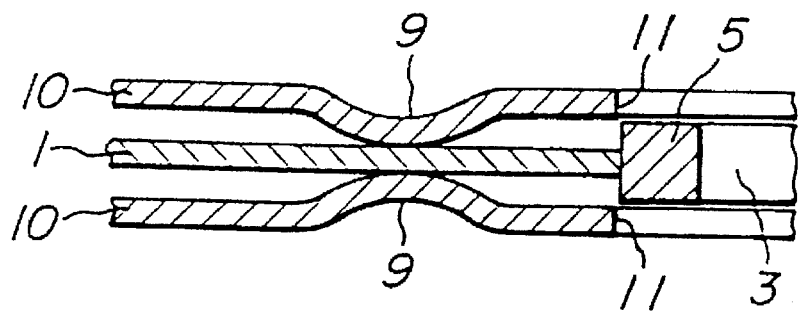
FIG. 9 is an enlarged sectional view showing a part of a metal gasket assembly according to the third embodiment of the present invention, which corresponds to the portion shown in FIG. 2.

Referring to FIG. 9, there is shown a metal gasket assembly according to the third embodiment of the present invention. In this metal gasket assembly, the peripheral member 5 of the metal gasket assembly A is made to have a thickness of 0.85 mm, i.e. not less than three times as large as that of the substrate metal sheet 1 (0.25 mm), and the peripheral member 5 is welded to the substrate metal sheet 1 so that the central planes, in thickness-wise direction, of the peripheral member 5 and the substrate metal sheet 1 is coplanar with each other. Two by-plates 10 with beads 9 are provided on both sides of the metal gasket assembly A. In this embodiment, an opening 11 for cylinder provided on the by-plates 10 is formed larger than those in the preceding embodiments so that the peripheral member 5 can be fitted therein when the metal gasket assembly is in use.

With this arrangement, spaces between the metal gasket assembly A and by-plates 10 are covered with the peripheral member 5 when they are fastened together by bolts for use. Accordingly, an intrusion of combustion gases is effectively prevented in this embodiment.

Figure 10:
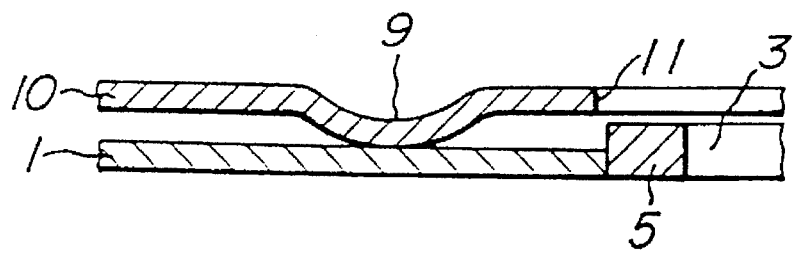
FIG. 10 is an enlarged sectional view showing a part of a metal gasket assembly according to the fourth embodiment of the present invention, which corresponds to the portion shown in FIG. 2.

Referring to FIG. 10, there is shown a metal gasket assembly according to the fourth embodiment of the present invention. In this metal gasket assembly, the peripheral member 5 of the metal gasket assembly A is made to have a thickness of 0.55 mm, i.e. not less than twice as large as that of the substrate metal sheet 1 (0.25 mm), and the peripheral member 5 is welded to the substrate metal sheet 1 so that one surface of the peripheral member 5 is coplanar with either surface of the substrate metal sheet 1. A by-plate 10 having the larger opening 11 is provided on a side of the metal gasket assembly A so that the peripheral member 5 can be fitted in the larger opening 11 of the by-plate 10 when the metal gasket assembly is in use. The metal gasket assembly according to this embodiment functions almost the same as that according to the third embodiment of the present invention.

Figure 11:
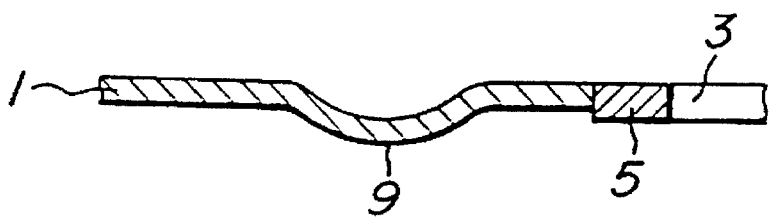
FIG. 11 is an enlarged sectional view showing a part of a metal gasket assembly according to the fifth embodiment of the present invention, which corresponds to the portion shown in FIG. 2.

Referring to FIG. 11, there is shown a metal gasket assembly B according to the fifth embodiment of the present invention. The metal gasket assembly B is produced by providing a bead on the substrate metal sheet 1 of the metal gasket assembly A in a region adjacent to the peripheral member 5. With this constitution, the metal gasket assembly can have sealing advantages due to the beads 9 as well as the peripheral member 5.

Referring to FIG. 12, there is shown a metal gasket assembly according to the sixth embodiment of the present invention, wherein two metal gasket assembly B according to the fifth embodiment are laminated. This constitution improves the elasticity of the entire metal gasket assembly, thereby generally enhancing the sealing effect of the metal gasket assembly.

Referring to FIG. 13, there is shown a metal gasket assembly according to the seventh embodiment of the present invention, wherein the metal gasket assembly B according to the fifth embodiment is accompanied with a by-plate 10. The metal gasket assembly according to this embodiment functions almost the same as that according to the sixth embodiment of the present invention.

Referring to FIG. 14, there is shown a metal gasket assembly according to the eighth embodiment of the present invention. In this metal gasket assembly, the peripheral member 5 of the metal gasket assembly B is made to have a thickness of 0.60 mm, i.e. not less than twice as large as that of the substrate metal sheet 1 (0.25 mm), and the peripheral member 5 is welded to the substrate metal sheet 1 so that one surface of the peripheral member 5 is coplanar with either surface of the substrate metal sheet 1. A by-plate 10 having the larger opening 11 is provided on a side of the metal gasket assembly B so that the peripheral member 5 can be fitted in the larger opening 11 of the by-plate when the metal gasket assembly is in use. The metal gasket assembly according to this embodiment functions almost the same as that according to the sixth embodiment of the present invention.

While the present invention has been described with reference to certain preferred embodiments, they were given by way of examples only. It is of course that various changes and modifications may be made without departing from the scope of the present invention as defined by the appended claims.

We claim:

1. A method for producing a metal gasket assembly comprising the steps of:

perforating a substrate metal sheet so that said substrate metal sheet has at least one aperture larger than a desired opening;

fitting a metal plate member having a thickness larger than that of said substrate metal sheet into said at least one aperture along the periphery thereof and welding them together; and perforating the welded metal plate member to form said desired opening thereon.

2. The method for producing a metal gasket assembly according to claim 1, wherein said welding is performed as a laser-welding.

3. The method for producing a metal gasket assembly according to claim 1, wherein most of said welded metal plate member is removed during said perforating.

4. The method for producing a metal gasket assembly according claim 3, wherein said metal plate member is a flat disk.

5. The method for producing a metal gasket assembly according to claim 4, wherein one surface of said disk is flush with one surface of said metal plate member.

* * * * *